United States Patent [19]

Hammond, Jr.

[11] Patent Number: 5,034,619
[45] Date of Patent: Jul. 23, 1991

[54] OPTICAL READER WITH DUAL VERTICALLY ORIENTED PHOTOEMITTERS

[75] Inventor: Charles M. Hammond, Jr., Skaneateles, N.Y.

[73] Assignee: Welch Allyn, Inc., Skaneateles Falls, N.Y.

[21] Appl. No.: 411,325

[22] Filed: Sep. 21, 1989

[51] Int. Cl.$^5$ ............................................. G06K 7/10
[52] U.S. Cl. ...................................... 250/569; 235/462
[58] Field of Search ..................... 250/566, 568, 569; 235/454, 455, 462, 472

[56] References Cited

U.S. PATENT DOCUMENTS

| | | | |
|---|---|---|---|
| 3,322,935 | 5/1967 | Wyke et al. | 235/462 |
| 3,676,690 | 7/1972 | McMillin et al. | |
| 3,808,447 | 4/1974 | Leavens, Jr. | |
| 4,041,279 | 8/1977 | Foote | |
| 4,136,821 | 1/1979 | Sugiura et al. | |
| 4,260,880 | 4/1981 | Thomas | 235/454 |
| 4,267,439 | 5/1981 | Thomas et al. | |
| 4,510,383 | 4/1985 | Ruppender | |
| 4,775,970 | 10/1988 | Ishii | |

Primary Examiner—David C. Nelms
Attorney, Agent, or Firm—Wall and Roehrig

[57] ABSTRACT

An optical reader is designed to be insensitive to specular reflection, particularly at tapered lead-in areas to the left and right of a coded record on a record member. The optical reader includes a photosensor that is oriented with its optical axis along the reader optical center line so as to be situated substantially perpendicular to the record member passing through a reader slot. There are upper and lower LEDs only, which are disposed respectively on opposite sides of the optical center line in a vertical plane. That is, the LEDs lie in a plane perpendicular to the path of a record member being swiped through the slot. In this way, no specular reflection at the lead-in areas will fall onto the photosensor. In addition, the effect of specular reflection occurring at areas of the record member in a plane perpendicular to its path of travel is reduced by a factor of two over an optical reader using a single LED.

10 Claims, 2 Drawing Sheets

OPTICAL READER WITH DUAL VERTICALLY ORIENTED PHOTOEMITTERS

BACKGROUND OF THE INVENTION

This invention relates to optical devices for reading a coded record on a substrate, and is more particularly directed to an optical scanning device for reading the coded records on a record member, such as a badge, card or ticket.

Bar coded badges have become increasingly popular in government and in industry, both for security access systems and for time and attendance purposes. In reading bar-coded identification badges, the bar coded area on the badge is positioned to move past the bar code reader or scanner in the badge reader. Typically, the badge is made up of a blank card or substrate, and a bar code symbol made up of a row of alternating dark and light stripes, is positioned a short distance from one edge of the card. Then other items, such as a photograph of the employee and a frame, can be placed on the card. Thereafter it is overlaid with a durable clear plastic laminate.

It is usually the case that the parts of the badge, particularly at the lateral edges of the badge, do not have a uniform thickness. Consequently, the overlay or laminate can be somewhat uneven or wavy at lead-in areas at the left and right ends of the bar code symbol. This unevenness can result in undesirable specular reflection into the scanner.

All known badge readers, employing LEDs, use either a single illuminating LED, two LEDs oriented in the horizontal plane, or four LEDs in crossed planes.

A single LED oriented in the horizontal plane, i.e., to the left or right of the optic axis and on the optical center line, can produce specular reflection at one end of the badge. A pair of LEDs oriented horizontally but on opposite sides of the optic axis can produce specular reflection at both ends of the badge, but the amount of desirable diffuse reflection from the bar code symbol will be twice that of the single LED arrangement.

An arrangement employing four LEDs, one to the right and one to the left of the optic axis, and two disposed respectively above and below the optical center line, will provide a signal four times the strength of a single LED arrangement. However, this arrangement is still susceptible to specular reflections at the lead-in areas at both ends, and is more expensive than a two LED arrangement in terms of component and manufacturing costs.

A single LED arrangement, with an LED situated in a plane perpendicular to the direction of badge travel, will be relatively insensitive to specular reflection caused by waviness in the laminate at the leading and trailing ends of the bar code symbol. However, the single LED arrangement will not have the high signal level of the multiple LED arrangements, and will not be immune to specular reflection caused by waviness occurring along a plane transverse to the direction of badge travel.

OBJECTS AND SUMMARY OF THE INVENTION

It is an object of this invention to provide an optical reader that avoids the drawbacks of the prior art.

It is a more particular object of this invention to provide a optical reader in which specular reflection is avoided, particularly at the lead-in areas at the lateral ends of the coded record, on the record member.

According to an aspect of this invention, an optical reader includes a photosensor having its optical axis along the device's optical center line, so as to be situated substantially perpendicular to a record member, such as a badge, moving through the reader slot on the device. This orientation is particularly effective for accurately reading a coded record, such as a bar code symbol. There are upper and lower LEDs disposed respectively on opposite sides of the optical center line in a vertical plane, i.e., the plane perpendicular to the path of the badge, which moves horizontally, i.e., left-to-right. In this way specular reflection from the waviness at the lead-in areas does not fall onto the photosensor.

In addition, the use of two LEDs, rather than one, reduces by a factor of two the effect of specular reflections resulting from waviness in the laminate occurring in a plane perpendicular to the path of the badge. This result is achieved because the specular reflection from only one LED is coupled into the photosensor, while the diffuse reflection from both LEDS is coupled into the photosensor.

In a preferred embodiment, the scanner has a one-piece molded housing with a generally horizontal tube containing the photosensor and focussing optics, and a pair of angled mounting plates situated above and below an aperture at one end of the horizontal tube. Upper and lower LEDs are respectively mounted on these plates, and a mirror situated behind the aperture directs the diffuse-reflected light to the photosensor.

The above and many other objects, features, and advantages of this invention will become apparent to those skilled in the art from the ensuing description of a preferred embodiment, which is to be read in connection with the accompanying Drawing.

DETAILED DESCRIPTION OF A PREFERRED EMBODIMENT

Figure 1:
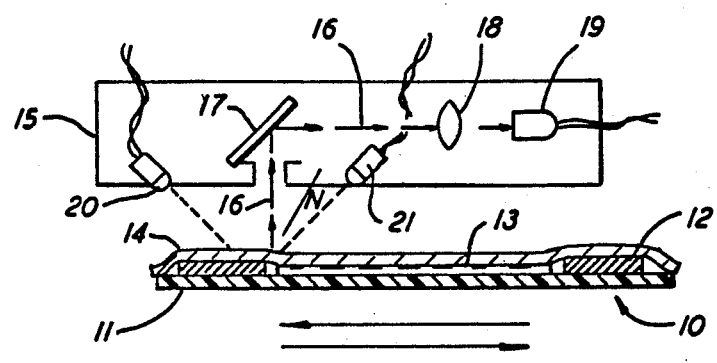
FIG. 1 is a schematic view of a particular bar code badge reader that uses the prior art.
Figure 2:
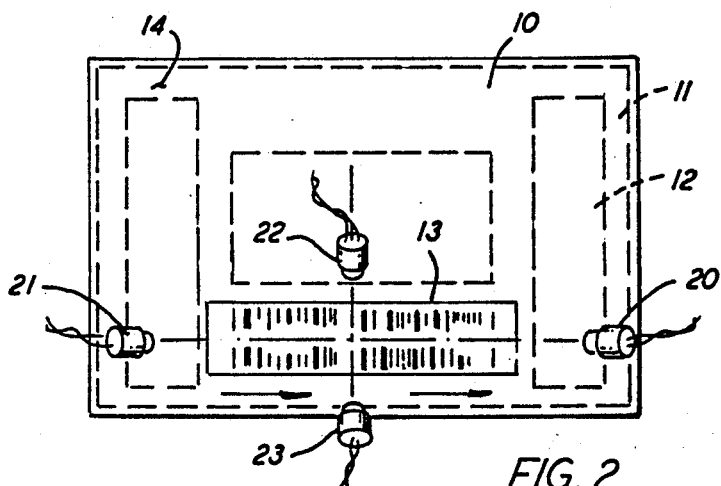
FIG. 2 is another schematic view for explaining badge readers using the prior art.

With reference to the Drawing, FIGS. 1 and 2 illustrate typical badge readers arranged according to the prior art, and this discussion of them is offered to underscore their shortcomings. As shown in FIG. 1 or FIG. 2, a record member, such as an identification badge 10, is formed of a base or substrate 11 and a frame 12 which surrounds a coded record, such as a bar code symbol 13. A clear laminate 14 is overlaid onto the frame 12 and symbol 13, and is typically sealed to it with an adhesive or by thermal welding. Because of differences in thickness between the frame 12, the bar code symbol 13, and spaces between them, the laminate 14 does not lie flat but has tapered or inclined areas or regions, most notable at left and right ends of the bar code symbol 13.

A bar-code scanner module 15 is provided typically within a swipe-type reader, for reading the code on the bar code symbol 13. The scanner module 15 has an optic axis 16 which is directed, in this case by a mirror 17, so that light which is reflected along the optic axis 16 is focused by a lens or other focusing optics 18 onto a photodetector 19. The latter is typically a photodiode. In most conventional scanner modules, there is one or a pair of LEDs 20, 21 disposed to the left and/or to the right of the optic axis 16 and on the center line of the badge bar code symbol so that light is incident on the bar code symbol 13. As shown in FIG. 2, in some prior-art modules, there can also be third and fourth LEDs 22 and 23, disposed above and below the optical center line of the bar code symbol. All conventional badge readers employing LEDs have a scanner module that has either a single LED, a pair of LEDs oriented along the horizontal plane, or four LEDs, arranged as shown in FIG. 2. These arrangements are unnecessarily sensitive to specular reflection, as discussed below.

As shown in FIG. 1, if there is a single LED or a pair of LEDs, e.g. 20, 21, that lie to the right and/or left of the optical axis 16, then the module 15 will be especially sensitive to specular reflection at the tapered or inclined areas where the clear laminate 14 does not lie flat, namely, at the lead-in areas to the bar code symbol 13. There may be additional regions where waviness, scratches, or marks in the laminate may also produce specular reflection.

In reading the bar code vertical bars and spaces, it is desirable that only diffuse reflection reach the photodetector 19. For this reason, the LEDs are arranged so that their light is incident at an angle, typically 30 to 60 degrees, relative to the surface of the badge 10. The diffusely reflected light is picked up at a right angle, i.e., perpendicular to the surface of the badge. However, at the lead-in area, i.e., shown to the left of the bar code symbol 13 in FIG. 1, the tapered or inclined surface of the clear laminate 14 may have a normal N that is quite different from that of the badge 10 itself. In this case, the taper is sufficient so that the angle of incidence from the LED 21, which equals the angle of reflection, produces specular reflected light directly along the optic axis 16 of the scanner module 15. The intensity of the specular reflected light can be significantly strong compared to the difference in light intensities between the dark bars and the light spaces in the bar code symbol 13. Consequently, this specular reflection can interfere with the ability of the scanning module 19 to produce a readable signal.

If a single LED 20 or 21 only is employed, the module 15 will be sensitive to specular reflection at one edge of the badge 10. However, the use of only a single LED also reduces the sensitivity to diffuse reflection by fifty percent. If four LEDs 20, 21, 22, and 23 are employed, as in the configuration shown in FIG. 2, the scanner will be sensitive to specular radiation from both tapered lead-ins, although the signal level as modulated by the bar code will be nominally four times as large as for a single LED.

A single LED 22 or 23 disposed either above or below the bar code symbol 13 would be insensitive to specular reflections from either tapered end of the bar code symbol, but would have a lower signal level in the area modulated by the bar code.

Figure 3:
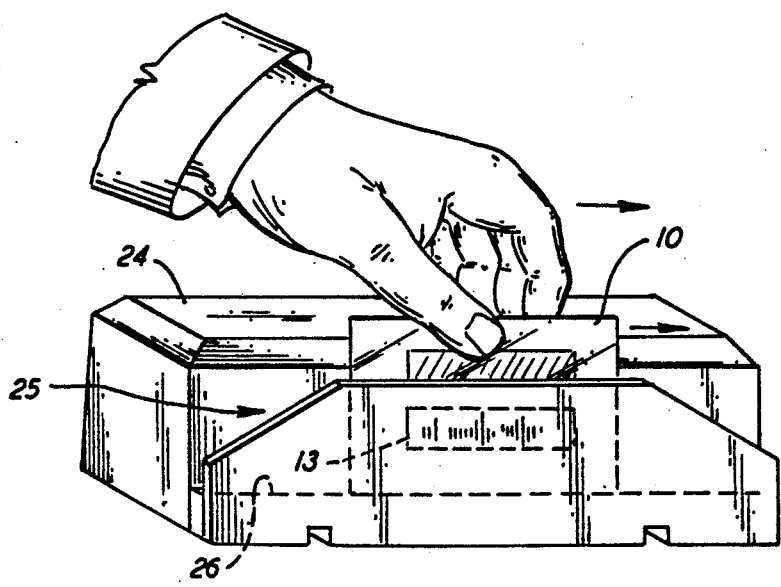
FIG. 3 is a perspective view of an optical reader of this invention.
Figure 4:
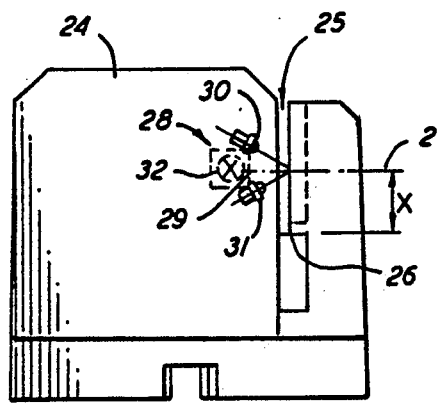
FIG. 4 is a side elevation of the optical reader of FIG. 3.

With reference next to FIGS. 3 and 4, an optical reader 24 is described which embodies the present invention and which overcomes the drawbacks of the arrangements just described. Here, reader 24 is in the form of a housing having a slot 25 through which record member 10 is swiped by hand. A floor or wear plate 26 for the slot 25 provides a surface against which one edge of record member 10 slides, so that coded record 13 is situated substantially at an optical center line 27 for reader 24.

A scanner 28 is mounted within the housing 24, so that its optic axis 29 is aligned with the optical center line 27. There is an upper LED 30 and a lower LED 31 situated above and below the optic axis 29, and a photodetector 32, which is disposed with its optic axis along the optic axis 29 of the scanner 28. The upper and lower LEDs 30 and 31 are respectively situated on opposite sides of the optical center line 27 of the reader and in a plane that is substantially perpendicular to record member 10 and to its path of travel through the slot 25. In this way, specular reflection from the LEDs 30 and 31 into the photosensor 32 is avoided, especially at the lead-in regions at the lateral ends of coded record 13. Here, the LEDs 30 and 31 have their optical axes oriented such that the light emitted from them is incident on record member 10 at about 30°, considered from the normal or perpendicular to record member 10.

The use of two LEDs 30, 31, rather than one LED, reduces by a factor of two the effect of specular reflection resulting from waviness in laminate 14 occurring in a plane perpendicular to the path of travel of record member 10 through slot 25. This result is achieved because the specular reflections from only one LED, 30 or 31, is coupled into photosensor 32, while the diffuse reflection from both LEDs 30 and 31 is coupled into photosensor 32.

Figure 7:
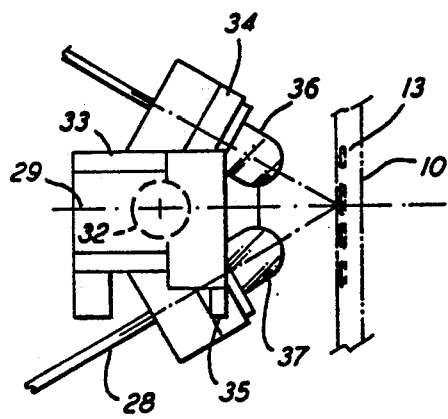
FIGS. 5, 6, and 7 are a front elevation, a top plan, partly cut away, and an end elevation, respectively, of an optical scanner according to an embodiment of this invention.
Figure 5:
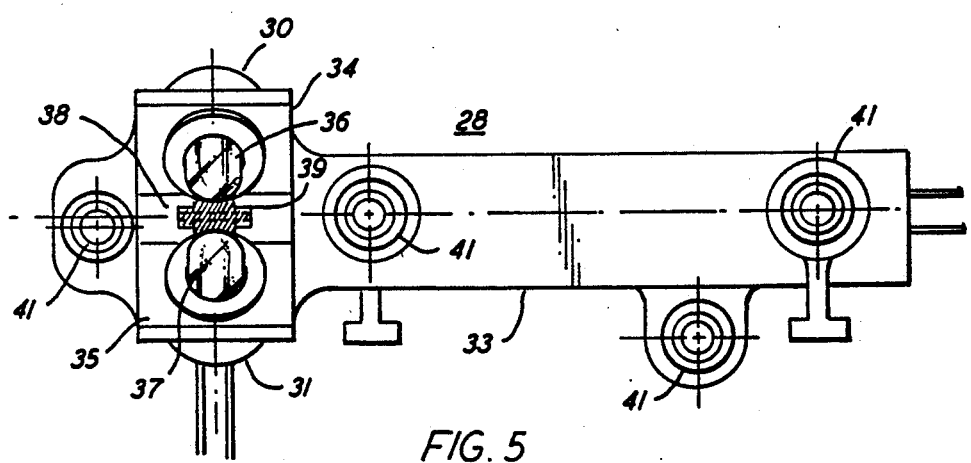
Figure 6:
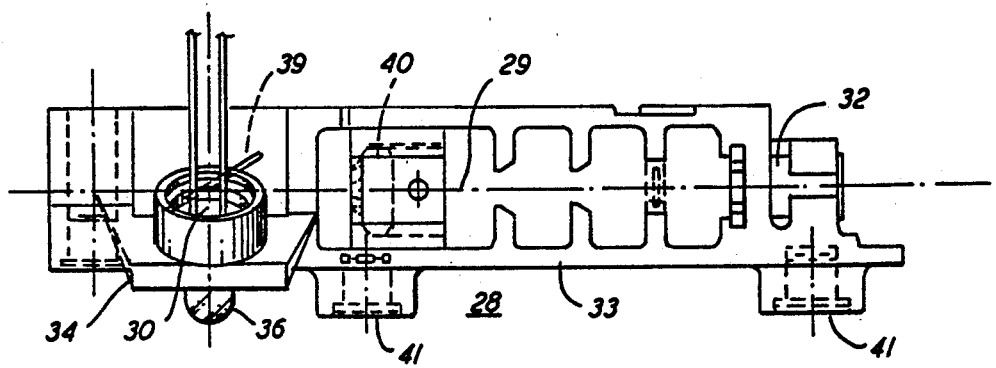

The scanner 28 can favorably have the form of the module as illustrated in FIGS. 5, 6, and 7. In this case, a generally tubular housing 33 has upper and lower mounting plates 34 and 35 at one end thereof with openings or sockets in which the LEDs 30 and 31 are respectively mounted. These plates angle in at about 30° from the vertical, so that the LEDs 30 and 31 will be appropriately aimed. Here, the upper or lower LEDs have lenses 36, 37 to focus the light on coded record 13 of a typical record member 10 (FIG. 7). An aperture or window 38 is situated between the mounting plates 34 and 35, and a mirror 39 is disposed behind the aperture and oriented at about 45°, to redirect the light that is reflected from record member 10 through focusing optics 40 onto the photodetector 32 that is situated in a receptacle at the far end of the tubular housing 33. While not shown, appropriate filters and additional optical means can also be included.

Mounting openings 41 can be provided in the tubular housing 33 to receive threaded fasteners for mounting the module 28 securely into optical reader 24.

In this embodiment, the housing 33, including the mounting plate 34 and 35, is molded from a suitable rigid or semi-rigid plastic synthetic resin.

While this invention has been described in detail with respect to a single-preferred embodiment, it should be understood that many modifications and variations would present themselves to those of skill in the art without departing from the scope and spirit of this invention, as defined in the appended claims.

What is claimed is:

1. An optical reader with reduced sensitivity to specular reflection from a surface of a record member that contains a coded record and has a substantially transparent lamination overlying said record member to cover the coded record, the surface of said record member having an inclined region; said optical reader comprising an optical scanner having a center line, the center line being optically aligned with the coded record on said record member; said optical scanner including a photosensor having an optical axis substantially along the center line of said optical scanner; said optical scanner further comprising first and second photoemitters respectively situated on opposite sides of the center line of said optical scanner and disposed in a common plane containing the center line of said optical scanner, said common plane being oriented to laterally intersect the inclined region when said region is optically aligned with the center line of said optical scanner; whereby specular reflection occurring at the inclined region is not coupled into said photosensor.

2. An optical reader according to claim 1 further comprising a one-piece optical housing including mounting plates above and below said optical center line for mounting said photoemitters.

3. An optical reader according to claim 2 wherein said optical housing has an aperture situated on said housing between said mounting plates, a tube extending perpendicular to the plane of said photoemitters, a mirror deflecting light entering said aperture into said tube, and photosensor mounting means within said tube on which said photosensor is mounted.

4. An optical reader according to claim 1 wherein said photoemitters are oriented to have optical axes that are each incident on the record member at about 30° from normal.

5. A method of reducing the sensitivity of an optical scanner to specular reflection from a surface of a record member that contains a coded record and has a substantially transparent lamination overlying said record member to cover the coded record, the surface of said record member having an inclined region, said method comprising the steps of:

optically aligning a center line of said optical scanner with the coded record on the record member;

reading the coded record on the record member with first and second photoemitters and a photosensor of said optical scanner, said photoemitters being respectively situated on opposite sides of the center line of said optical scanner, and disposed in a common plane containing the center line of said optical scanner, said common plane being oriented to laterally intersect the inclined region when said region is optically aligned with the center line of said optical scanner; whereby specular reflection occurring at the inclined region is not coupled into said photosensor.

6. A method of reducing the sensitivity of an optical scanner, as recited in claim 5, further comprising the step of orienting said first and said second photoemitters to have optical axes that are each incident on the record member at about 30° from normal.

7. An optical reader with reduced sensitivity to specular reflection from a surface of a record member that contains a bar code symbol and has a substantially transparent lamination overlying said record member to cover the bar code symbol and lead-in areas at lateral ends of the bar code symbol; said optical reader comprising a housing having a slot therein defining a planer path of travel for said record member, said record member being drawn past an optical scanner in said housing adjacent said path of travel, and said optical scanner having an optical center line disposed a predetermined distance from a base of said slot to coincide with said bar code symbol on said record member in said slot; said optical scanner including a photosensor having an optical axis along said optical center line so as to be situated substantially perpendicular to said record member passing through said slot; and first and second photoemitters respectively situated on opposite sides of said optical center line in a common plane containing the optical center line of said optical scanner, said common plane being perpendicular to the path of travel of said record member as it passes through said slot, so that specular reflection occurring at the lead-in areas is not coupled into said photosensor.

8. An optical reader according to claim 7 further comprising a one-piece optical housing including mounting plates above and below said optical center line for mounting said photoemitters.

9. An optical reader according to claim 8 wherein said optical housing has an aperture situated on said housing between said mounting plates, a tube extending perpendicular to the plane of said photoemitters, a mirror deflecting light entering said aperture into said tube, and photosensor mounting means within said tube on which said photosensor is mounted.

10. An optical reader according to claim 7 wherein said photoemitters are oriented to have optical axes that are each incident on said record member at about 30° from normal.

* * * * *